United States Patent [19]

Qasim et al.

[11] 4,291,859
[45] Sep. 29, 1981

[54] PLUG-TYPE VALVE

[75] Inventors: Javed Qasim, Diamond Bar; Samuel C. Walker, Fullerton; Paul A. Longwell, Encinitas, all of Calif.

[73] Assignee: Aerojet-General Corporation, La Jolla, Calif.

[21] Appl. No.: 101,625

[22] Filed: Dec. 10, 1979

[51] Int. Cl.³ .............................................. F16K 5/00
[52] U.S. Cl. .................................... 251/123; 251/309
[58] Field of Search ............... 251/123, 124, 309, 315, 251/304

[56] References Cited

U.S. PATENT DOCUMENTS

| | | | |
|---|---|---|---|
| 1,112,006 | 9/1914 | Hollis | 251/124 |
| 1,249,601 | 12/1917 | Ferranti | 251/124 |
| 2,609,174 | 9/1952 | Heinen | 251/163 |
| 2,708,094 | 3/1955 | Heinen | 251/163 |
| 2,717,758 | 9/1955 | Deventer | 251/124 |
| 2,799,467 | 7/1957 | Hedene | 251/124 |
| 2,799,468 | 7/1957 | Deventer | 251/124 |
| 3,005,617 | 10/1961 | Wolfensperger | 251/124 |
| 3,643,914 | 2/1972 | Bake | 251/124 |

Primary Examiner—Martin P. Schwadron
Assistant Examiner—A. Michael Chambers
Attorney, Agent, or Firm—Fischer, Tachner & Strauss

[57] ABSTRACT

An improved bidirectional plug valve with increased $C_v$ or decreased insertion pressure loss is provided. The improvements reside in a unique combination of surprising structural parameters including an increase in the diffuser-to-dump transition radii, a high degree of dimension match for diffuser and plug chamber, an unconventionally large diffuser angle, and most surprisingly, a reduction in plug port size with a substantial corresponding reduction in plug size and dump area. The indicated structural features of the invention, combine synergistically to provide an unexpected $C_v$ improvement of approximately 50% and a substantial cost reduction for the valve operating mechanism.

5 Claims, 11 Drawing Figures

PLUG-TYPE VALVE

TECHNICAL FIELD

This invention relates generally to fluid control valves, and more specifically to improvements in the pressure ddrop characteristics of plug-type valves. The $C_v$ of a plug-type valve is substantially increased by a unique combination of surprising structural parameters including an increase in the diffuser-to-dump transition radii, a high degree of dimension match for diffuser and plug chamber, an unconventionally large diffuser angle, and most surprisingly, a reduction in plug port size with a substantial corresponding reduction in plug size and dump area.

BACKGROUND ART

Plug-type valves are well known in the prior art, particularly in the oil and gas industries where their positive sealing and superior flow characteristics are highly advantageous for controlling the flow of such fluids. As a result of the performance advantages of such valves, their design permits substantial reduction in plug mechanism size, and thus provides considerable cost savings, while still satisfying field operating requirements set by the user industries. Reduction in plug mechanism dimensions is normally achieved by utilizing inlet and outlet flow passages that are generally divergent in cross-section between the plug port and the pipe-connecting flange on the respective ends of the valve. Plug-type valves of this general configuration are disclosed in U.S. Pat. Nos. 2,609,174 and 2,708,094 to Heinen, now expired.

Providing the manifest advantages of reducing plug port size while still satisfying the flow rate requirements established for the valve, is a continuous objective of valve manufacturers and was a primary motivating factor for the present invention. More particularly, the present invention provides a surprisingly high flow rate capability, or from an alternative point of view, a surprisingly low pressure drop for a given flow rate. A common term used in the valve industry for specifying this important performance characteristic, is "$C_v$," which is expressed in gallons per minute (GPM) and is defined as the rate of flow of water at 60° F. with an insertion loss, or pressure drop of 1 psi.

SUMMARY OF THE INVENTION

The high flow rate characteristic of plug-type valves of the present invention result from a unique, synergistic combination of structural design features which, in one embodiment comprising a sixteen inch valve, provides better than a fifty percent improvement in $C_v$ as compared to a prior-art sixteen inch plug-type valve of conventional design. For example, applicants have increased the $C_v$ of a conventional valve measured at 4800 GPM, to about 7300 GPM by means of the present invention. This novel design combination includes an increase in the diffuser-to-dump transition radii, a high degree of dimension match for diffuser and plug chamber, an unconventionally large angle, and a reduction in plug dimensions. The last indicated feature, the details of which will be more fully disclosed hereinafter, is particularly surprising in view of the generally held belief that flow rate increases with increasing plug port area. More specifically, despite the industry convention of using a plug port area no less than seventy percent of pipeline flow port area in such valves, by means of the present invention the plug port area has been reduced to approximately fifty-five percent of pipeline flow port area with substantially greater flow rate.

It is therefore an object of the present invention to provide a plug-type valve that realizes all the advantages of conventional valves of that type, but which provides the additional advantage of substantially improved flow characteristics.

It is an additional object of the present invention to provide a significantly greater $C_v$ in a plug-type valve.

It is still an additional object of the invention to provide a plug-type valve having a unique combination of design improvements, including a reduced plug port area, that improves valve performance.

These and other objects and advantages of the invention will be readily apparent from the consideration of the following detailed description of a preferred embodiment taken in conjunction with the accompanying drawings in which:

DETAILED DESCRIPTION OF A PREFERRED EMBODIMENT

Figure 1:
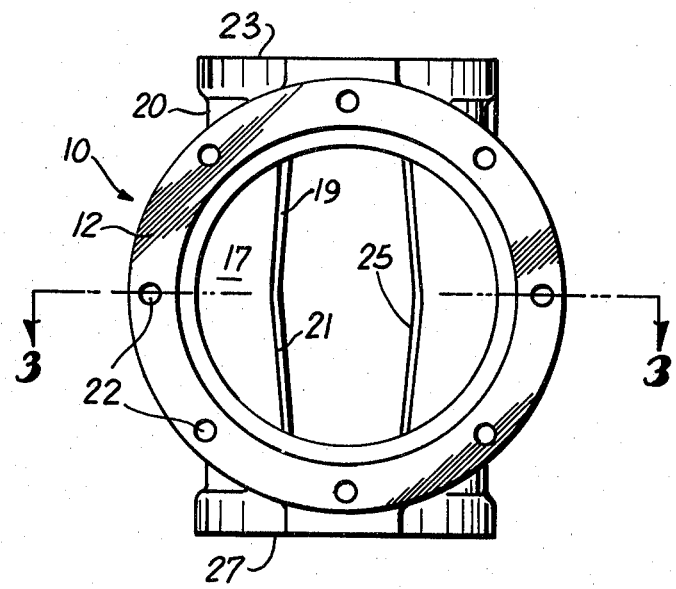
FIG. 1 is an end view of a valve of the present invention.
Figure 2:
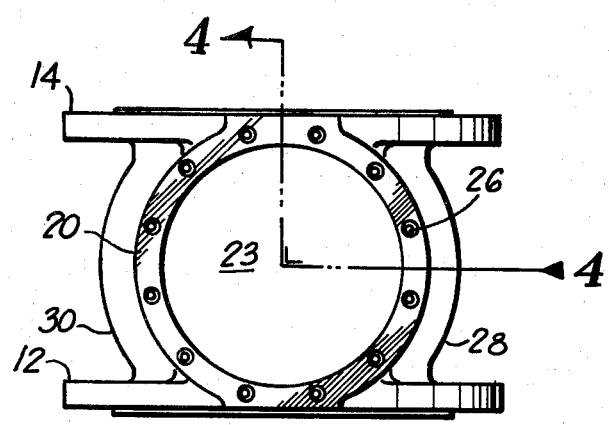
FIG. 2 is a top view of a valve of the present invention.

Referring now to FIGS. 1 through 6, which are illustrative of a particular embodiment of a plug-type valve employing the present invention, it will be seen that the structure involves generally a valve 10 having flanges 12 and 14, which flanges are adapted by means of a plurality of bolt holes, such as holes 22, to be joined to corresponding flanges of adjoining downstream and upstream pipes, respectively, between which the valve of the present invention may be installed to provide means for controlling the flow of fluid therebetween.

The illustrated embodiment is symmetrical and therefore has bidirectional flow characteristics with inlet and outlet portions being identical. More specifically, each of the above-mentioned flanges is joined to a valve body 20 by a diffuser portion such as outlet diffuser 16 which joins flange 12 to body 20. Valve body 20 utilizes a rotatable plug and slip mechanism 18, shown in FIG. 3 in the open position, to block the flow of fluid between the flanges when valve 10 is in the closed position, and to permit the flow of fluid between the flanges when valve 10 is in the open position. In its open position, the valve is designed to produce a small pressure drop between the flanges, so that the effect of valve 10 on flow rate of the fluid between the adjoining pipes is minimal, or in other words, so that the $C_v$ of the valve is maximal.

The general objective of providing a valve in which $C_v$ is maximized is considered in light of the concurrent objective of providing a valve of the type shown which is of the lowest possible cost and that still satisfies the requirements for flow performance of the valve. It is primarily with these concurrent objectives being considered that the inlet and outlet portions of valve 10 narrow or decrease in width and increase in height and as they progress inwardly from the flanges 12 and 14, with the result that the valve passage is narrow and high or of greater vertical extent than horizontal extent at the intersection with the plug opening such as at intersection 25 as shown best in FIG. 1.

Figure 3:
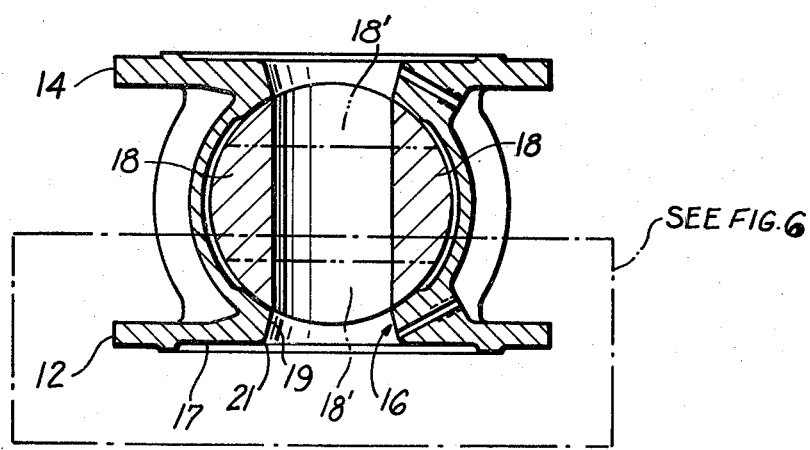
FIG. 3 is a sectional top view of the invention taken along lines 3—3 of FIG. 1.
Figure 4:
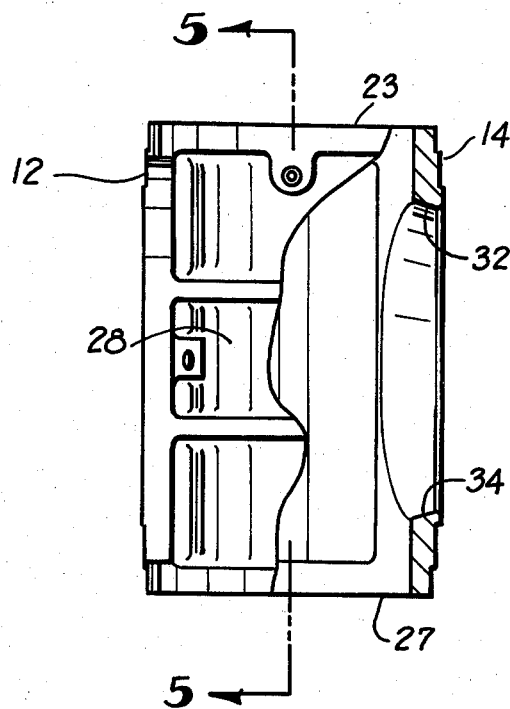
FIG. 4 is a sectional side view of the invention taken along lines 4—4 of FIG. 2.
Figure 5:
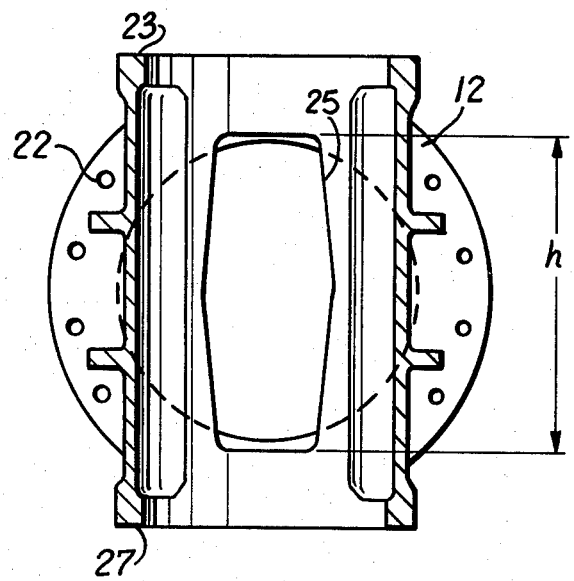
FIG. 5 is a sectional end view of the invention taken along lines 5—5 of FIG. 4.
Figure 6:
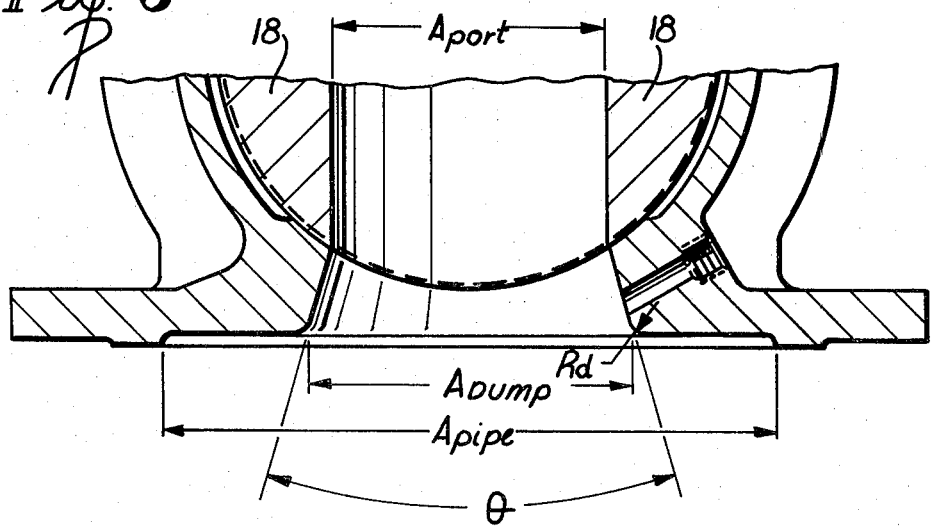
FIG. 6 is an enlarged view of a portion of the invention as seen in FIG. 3.

Accordingly, each of the inlet and outlet portions of valve 10 terminates on its outer end, in a flange connected to an intersecting pipe, and on its inner end, in the valve body 20. Body 20 is a generally cylindrical chamber formed by top and bottom body sections 23 and 27, respectively, and body side sections 28 and 30, respectively. Body 20 houses the valve operating mechanism including plug and slip combination 18 for the purpose of providing means for selectively interrupting the flow of fluid between the respective flanges of valve 10. In FIGS. 3 and 6, the plug and slip combination 18 is shown in its open configuration by solid lines and is shown in its closed configuration in dotted lines and then designated by the reference number 18'.

Because the valve of the present invention is symmetrical, the inlet and outlet diffusers are identical. Therefore, a complete understanding of the present invention with regard to the embodiment illustrated in FIGS. 1 through 6 will be obtained from a description of outlet diffuser 16 with the realization that the inlet is identical. More specifically, the pipe end of each diffuser is adapted to match the inside diameter of the connecting pipe by the dump region 17. Each diffuser has generally tapered side walls with the area being reduced in the direction of the valve body 20, and also has tapered top and bottom walls with the area increased slightly toward valve body 20. The side wall structure, as shown best in FIG. 3, has a tapered region 19 joined by a transition region 21 to the dump region 17. The top and bottom tapered regions, shown best in FIG. 4, comprise substantially linear tapered portions 32 and 34, respectively.

It will be apparent that the general configuration of the embodiment of the present invention illustrated in FIGS. 1 through 6, is similar in some respects to prior art valves of the plug-type, namely, those having symmetrical diffusers with areas reduced at the plug port sections for permitting use of a valve operating mechanism of reduced size, while interfacing existing pipe sections of large diameter. However, as will be hereinafter more fully understood, the present invention utilizes a unique combination of geometrical parameters which will be more fully described below and which render the plug-type valve of the present invention superior as a result of improved flow characteristics. For purposes of better understanding the unique parameters of the present invention, it will be advantageous to first consider the definitions illustrated in FIG. 6, namely, the definitions for the pipe area $A_{pipe}$, the dump area $A_{dump}$, the plug area $A_{port}$, the diffuser included angle $\theta$, and the dump transition radius $R_d$. If the diffuser were conical, included angle $\theta$ would correspond to an equivalent conical angle $\phi$, which is defined based on $A_{port}$, $A_{dump}$, and the diffuser geometry.

As indicated in FIG. 6, $A_{pipe}$ is the cross-sectional area of the adjoining downstream and upstream pipes. $A_{dump}$ is the cross-sectional area of the outlet of the diffuser portion at the intersection of regions 17 and 19, in a plane that is perpendicular to the direction of fluid flow and which intersects the transition regions 21 as shown in FIGS. 3 and 6. $A_{plug}$ is the cross-sectional area in a plane perpendicular to the direction of fluid flow and which plane includes the intersection perimeter 25 of the plug port as discussed previously in conjunction with FIG. 1.

The selection of parameters for the present invention, in terms of the above defined valve characteristics, is made on the basis of applicants' novel plug-type valve design in accordance with geometrical parameter ranges supported by data they have derived and which are discussed below in conjunction with FIGS. 7 through 11.

Applicants have found that by limiting the radius $R_d$ to a range of about 6% to 15% of the equivalent plug port diameter based on area; by using diffusers having an equivalent conical diffuser angle in the range of 15° to 30°; by employing a ratio of $A_{dump}$ to $A_{pipe}$ in the range of 55 to 70 percent and a ratio of $A_{port}$ to $A_{pipe}$ in the range of 50 to 60 percent; by constraining the height of the open port configuration of the plug to a range of about 105% and 115% of the inner diameter of the adjoining pipes; by constraining the open port geometry of the plug to conform to the dimensions of the adjacent body flow channel within a range of 100% to 102%; and by constraining the relative offset between open plug port and adjacent body flow channel to within a range of 0% to 2% of plug width in the horizontal direction and within a range of 0% and 0.75% of plug height in the vertical direction; a surprisingly significant improvement in $C_v$ is achieved. By way of example, by means of the present invention, an improvement of 50 percent in the 16 inch valve embodiment illustrated in FIGS. 1 through 6 has been achieved as compared to conventional 16 inch plug-type valves. Of the aforementioned parameters of the present invention, the diffuser angle and the ratio of $A_{port}$ to $A_{pipe}$ are especially surprising in view of the industry convention of using an equivalent conical diffuser angle not greater than 15° and a ratio of $A_{port}$ to $A_{pipe}$ of at least 70 percent. Thus, the present invention utilizes an equivalent conical diffuser angle nearly two times as large as that conventionally used for valves of the plug-type herein disclosed and also utilizes an area ratio $A_{port}$ to $A_{pipe}$ that is substantially lower than the industry convention of 70 percent.

The manner in which the aforementioned novel parameters of the present invention have been discovered and the criteria for selecting such parameters for plug-type valves of the present invention for various diameters of interfacing pipes, will now be discussed in detail in conjunction with FIGS. 7 through 11.

Figure 7:
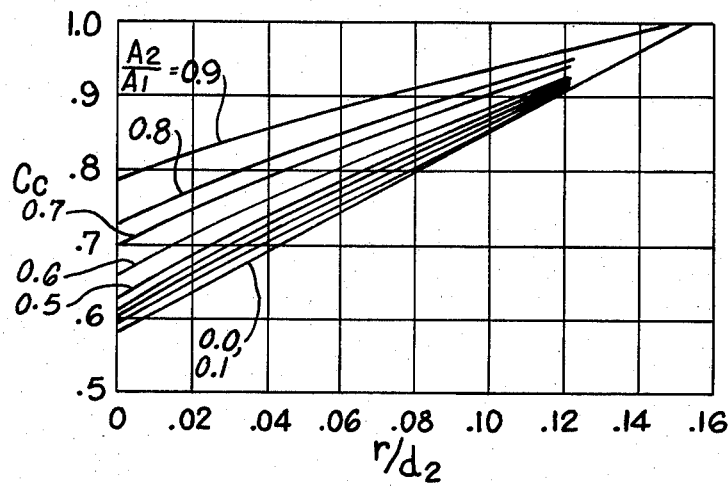
FIG. 7 is a graph of contraction coefficient versus diffuser-to-dump transition radii for various plug area to pipe area ratios.

FIGS. 7 through 11 provide graphs of various data used by applicants for the purpose of selecting the unique parameter ranges of the invention. More specifically, FIG. 7 is a graph of contraction coefficient $C_c$ versus diffuser transition radii ratios $r/d_2$ for various ratios of plug port area to pipe area. The contraction coefficient $C_c$ is indicative of the relative size of the vena contracta resulting from the sudden contraction from a first area $A_1$, such as the pipe port area $A_{pipe}$ in FIG. 6, to a reduced area $A_2$, such as the plug port area $A_{port}$ of FIG. 6. The graph of FIG. 7 shows that the value of contraction coefficient for an area ratio equal to zero, which is hereinafter denoted $C_{co}$, is a linear function of the ratio of the transition radius to the equivalent diameter of the port area. Utilizing this linear characteristic for $C_{co}$, it has been determined by the applicants that a close approximation for an analytical formula for the parameter $C_{co}$ may be represented by the following equation:

$$C_{co} = 0.586 + 2.65 \times r/d_2 \text{ but } \leq 1.0$$

and further that the loss coefficient $K_t$ may be defined by the following equation:

$$K_t = K_{to}[1 - (A_2/A_1)1.5]$$

where $K_{to}$ is equal to $(1/C_{co} - 1)^2$

Figure 8:
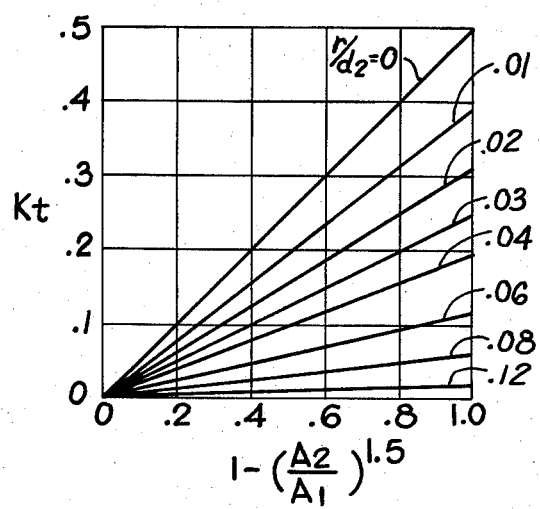
FIG. 8 is a graph of contraction loss coefficient versus a selected exponential function of plug area to pipe area ratio for various diffuser-to-dump transition radii.

The above indicated exponential relationship between the loss coefficient $K_t$ and the area ratio $A_2/A_1$ was selected on the basis of providing a good analytical fit in accordance with the data illustrated graphically in FIG. 8 in which it is shown that the relationship between $K_t$ and the indicated exponential function of the area ratio, is linear for various radius ratios $r/d_2$. From the indicated characteristics of FIG. 8, it will be observed for any given area ratio $A_2/A_1$ that one may now select a maximum value of radius r which minimizes $K_t$ without unnecessarily increasing r inefficiently beyond that maximum which might result in structural impracticalities in the completed valve. By way of example, in the embodiment of the invention illustrated in FIGS. 1 through 6, in which the pipe inner diameter is 15.25 inches, it has been determined by means of the aforementioned characteristic of loss coefficient that r, that is, $R_d$ which defines the radius of the transition region 21 of FIG. 6, should be selected to be within the range of 0.75 to 1.5 inches, or about 6% to 15% of the inner diameter of the interfacing pipes.

Figure 9:
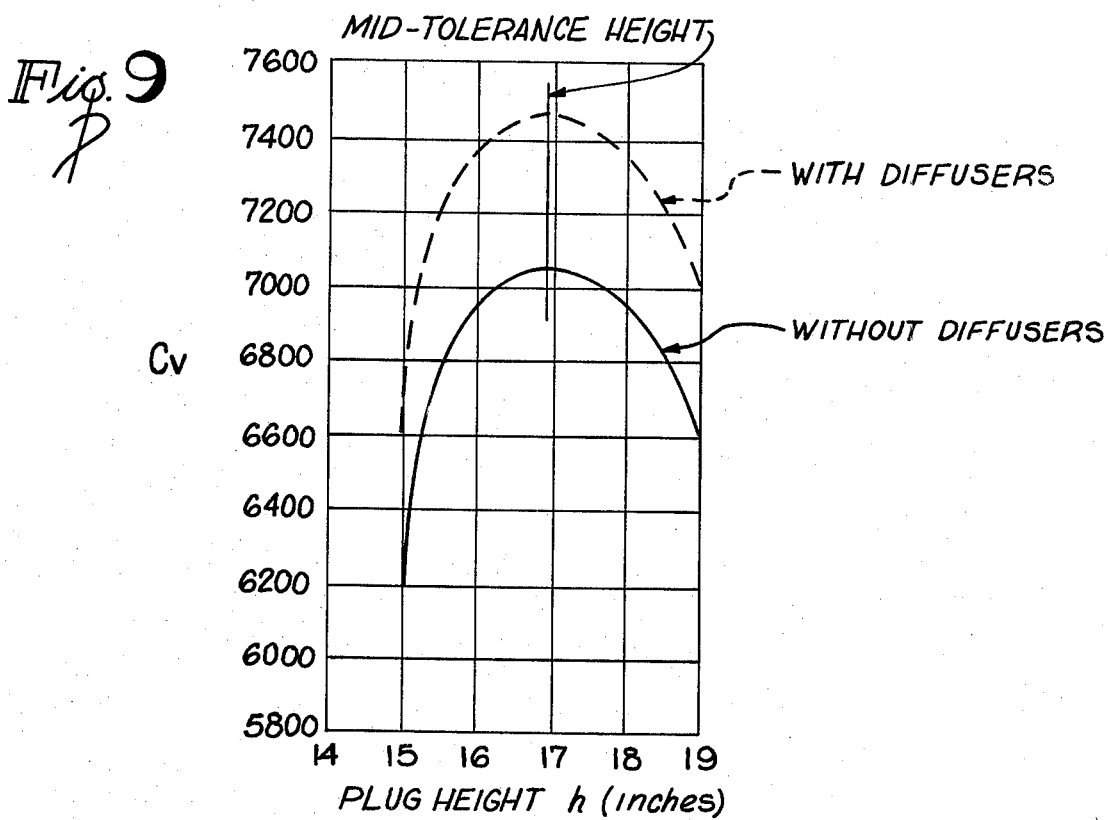
FIG. 9 is a graph of $C_v$ versus plug height for a selected valve size illustrating the present invention.

Perhaps most surprising of the various parameters of applicants' invention, is that parameter referred to herein as plug port height. It is a generally accepted rule in the industry that the $C_v$ of a valve increases as the plug port area is increased. However, applicants have found that although this is true in their present invention up to a point, most unexpectedly, $C_v$ decreases as plug port height is increased beyond an optimum value. The graph of FIG. 9 illustrates this surprising behavior for the 16 inch valve embodiment illustrated in FIGS. 1 through 6, with and without the unique diffuser design previously discussed in conjunction with those figures.

Figure 10:
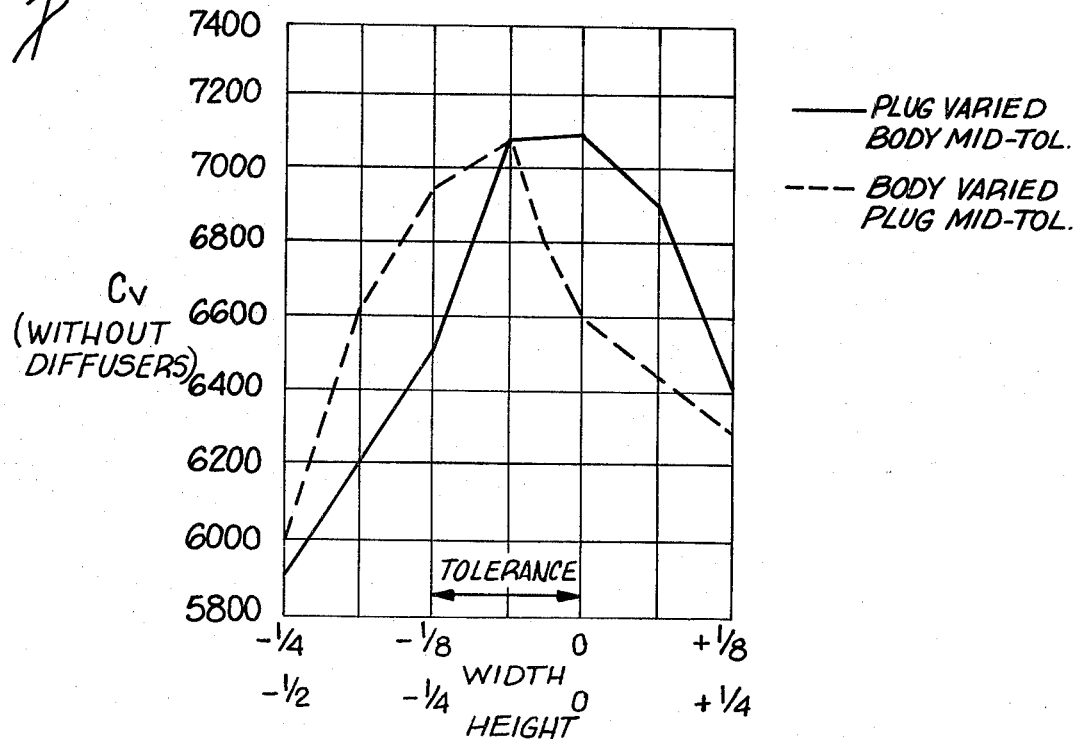
FIG. 10 is a graph of $C_v$ versus plug and body dimensional tolerance variations illustrating the present invention.

Another surprising feature of the present invention is the unexpected improvement in $C_v$ resulting from the limitation on dimensional variations between the port area at the plug port defined by the body dimensions and the flow area through the plug in its open mode, to avoid discontinuities in flow. Although those skilled in the relevant art will understand that discontinuities of the type herein described are inimical to flow characteristics to a plug type valve, it is not generally known that $C_v$ may be improved to the extent applicants have done so in their invention by means of such stringent limitations on these dimensional parameters. More specifically, for the 16 inch valve embodiment illustrated in FIGS. 1 through 6, the graph of FIG. 10 illustrates the manner in which the $C_v$ changes as a function of dimensional variations between the plug and body and shows that there is a critical area wherein the plug is larger than the body by no more than approximately 1/16 inches in height and 1/32 inches in width and wherein the body is smaller than the plug by no more than the same approximate variations, wherein $C_v$ is reduced by no more than about 100 gallons per minute below its peak.

Figure 11:
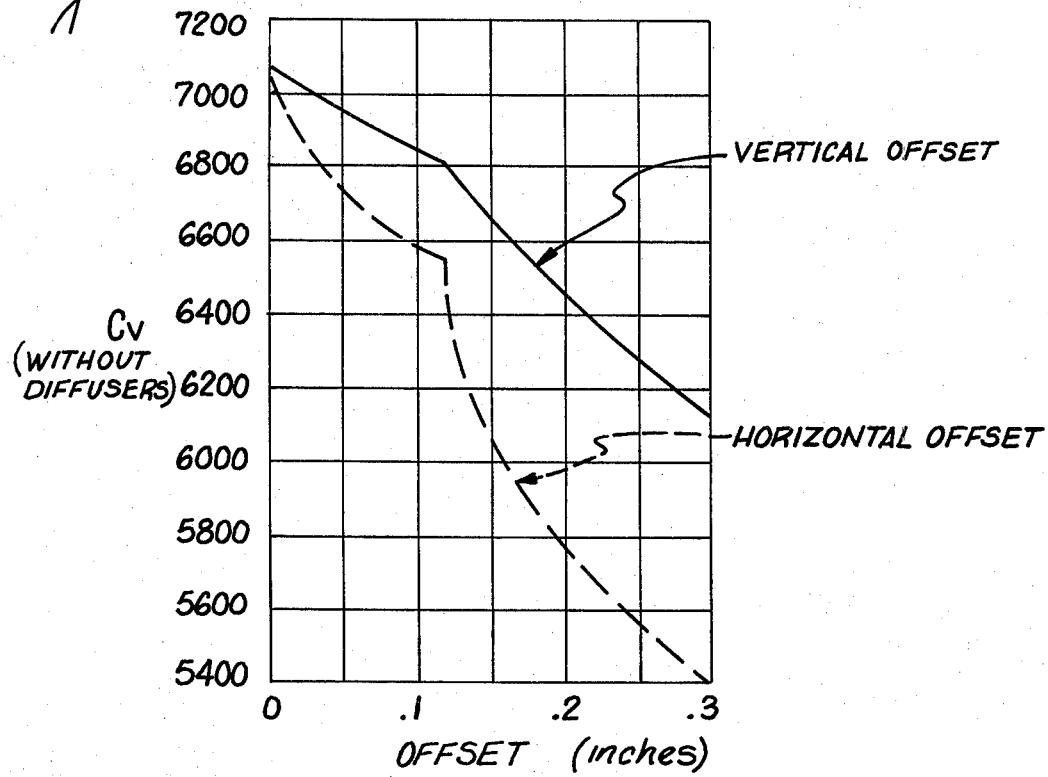
FIG. 11 is a graph of $C_v$ versus vertical and horizontal offset between the body and plug of the present invention.

FIG. 11 illustrates the effect on $C_v$ for the 16 inch valve embodiment of the invention illustrated in FIGS. 1 through 6 resulting from vertical and horizontal offset between the body and plug port area of the valve. As seen in the graph of FIG. 11, for the embodiment illustrated, a vertical offset between plug and plug port area of approximately 0.12 inches results in a $C_v$ decrease of approximately 300 gallons per minute, while a horizontal offset of about 0.04 inches produces about the same decrease in $C_v$.

In order to provide design parameters that are based on applicants' discoveries and that are applicable to a range of plug-type valve sizes, the following table expresses the parameter ranges of the present invention in general format such as percentage that may easily be applied to any size valve.

TABLE I

| | Parameter | Range | Measured Cumulative Improvement in $C_v$ (GPM - 16" valve) |
|---|---|---|---|
| 1. | $R_d$ | 6%–15% of equivalent port diameter | 1,580 |
| 2. | Equivalent conical diffuser angle | 15°–30° | |
| | $A_{dump}/A_{pipe}$ | 55%–70% | 1,845 |
| | $A_{port}/A_{pipe}$ | 50%–60% | |
| 3. | Plug port height | 105%–115% of pipe inner diameter | 2,500 |
| 4. | Relative plug offset-vertical | 0%–0.75% of plug height | 2,500 |
| | Relative plug offset-horizontal | 0%–2% of plug width | |
| 5. | Plug port height + width | 100%–102% of body port height and width, respectively | 2,500 |

It will now be apparent that what has been disclosed herein is an improved bidirectional plug-type valve in which various combinations of unique structural parameters, including those which deviate substantially from accepted industry standards, provide a surprisingly significant improvement in valve flow characteristics. More specifically, the invention comprises a plug-type valve of geometrical configuration defined by parameters limited to fall within the following ranges: namely, limiting the radius $R_d$ to a range of about 6% to 15% of the equivalent for plug port diameter; utilizing diffusers having an equivalent conical diffuser angle in the range of 15 to 30 degrees; a ratio of $A_{dump}$ to $A_{pipe}$ in the range of 55 to 70% and a ratio of $A_{port}$ to $A_{pipe}$ in the range of 50 to 60% constraining the height of the open port configuration of the plug to a range of about 105% to 115% of the inner diameter of the adjoining pipes; constraining the open port dimensions of the plug to conform to the dimensions of the adjacent body flow channel within a range of 100% to 102%; and by constraining the relative offset between open plug port and adjacent body flow channel to within a range of 0% and 2% of the plug width in the horizontal direction and within a range of 0% and 0.75% of plug height in the vertical direction. It will be understood that significant $C_v$ improvement may be achieved by means of any one or any subcombination of the indicated parameter ranges.

It will now also be apparent that the aforementioned parameter ranges of applicants' invention are not the result of mere exercise in routine mechanical skill in the art of valve design, but on the contrary, in view of their substantial deviation from industry convention with regard to design parameters for plug-type valves, and further in view of the surprising improvement in flow characteristics achieved thereby, are highly inventive in nature, that invention being defined and limited in scope only by the claims appended hereto.

We claim:

1. In an improved plug valve apparatus of the type having an inlet, an outlet, and a plug mechanism connected between the inlet and the outlet for selective control of fluid flow between upstream and downstream pipes of cross-sectional area, $A_{pipe}$, and to which the valve is adapted for connection, the inlet and the outlet each defining a diffuser of equivalent conical angle $\phi$ and of substantially diverging cross-section with the smallest cross-sectional area thereof, $A_{port}$, located at the diffuser port adjacent the plug mechanism and the largest cross-sectional area thereof, $A_{dump}$, located at the diffuser port adapted for connection to a pipe by a transition region between $A_{dump}$ and $A_{pipe}$, having a transition radius $R_d$; the improvement comprising:

said valve apparatus in which said transition radius $R_d$ is in the range of 6% to 15% of the diameter of a circle equivalent in area to $A_{port}$; in which each said diffuser equivalent conical angle $\phi$ is in the range of 15° to 30°; in which the ratio of $A_{dump}$ to $A_{pipe}$ is in the range of 0.55 to 0.70; and in which the ratio of $A_{port}$ to $A_{pipe}$ is in the range of 0.50 to 0.60.

2. The improvement recited in claim 1 further comprising:

said valve apparatus in which the flow channel height of said plug mechanism at $A_{port}$ and in its open port configuration is in the range of 1.05 to 1.15 times the inner diameter of the pipes to which said valve is adapted for connection.

3. The improvement recited in claim 1 further comprising:

said valve apparatus in which the flow channel width and height dimensions of said plug mechanism at $A_{port}$ are constrained to be in the range of 1.00 to 1.02 times the corresponding dimensions of the adjacent valve flow channel.

4. The improvement recited in claim 1 further comprising:

said valve apparatus in which the relative offset of said plug mechanism at $A_{port}$ relative to the adjacent valve flow channel and in vertical and horizontal directions relative to the direction of fluid flow is in the range of 0 to 0.0075 of plug port height in said vertical direction and in the range of 0 to 0.02 of plug port width in said horizontal direction.

5. In an improved plug valve apparatus of the type having an inlet, an outlet, and a plug mechanism connected between the inlet and the outlet for selective control of fluid flow between upstream and downstream pipes of cross-sectional area, $A_{pipe}$, and to which the valve is adapted for connection, the inlet and the outlet each defining a diffuser of equivalent conical angle $\phi$ and of substantially diverging cross-section with the smallest cross-sectional area thereof, $A_{port}$, located at the diffuser port adjacent the plug mechanism and the largest cross-sectional area thereof, $A_{dump}$, located at the diffuser port adapted for connection to a pipe by a transition region between $A_{dump}$ and $A_{pipe}$, having a transition radius $R_d$; the improvement comprising:

said valve apparatus in which said transition radius $R_d$ is in the range of 6% to 15% of the diameter of a circle equivalent in area to $A_{port}$; in which each said diffuser equivalent conical angle $\phi$ is in the range of 15° to 30°; in which the ratio of $A_{dump}$ to $A_{pipe}$ is in the range of 0.55 to 0.70; in which the ratio of $A_{port}$ to $A_{pipe}$ is in the range of 0.50 to 0.60; in which the flow channel height of said plug mechanism at $A_{port}$ and in its open port configuration is in the range of 1.05 to 1.15 times the inner diameter of the pipes to which said valve is adapted for connection; in which the flow channel width and height dimensions of said plug mechanism at $A_{port}$ are constrained to be in the range of 1.00 to 1.02 times the corresponding dimensions of the adjacent valve flow channel; and in which the relative offset of said plug mechanism at $A_{port}$ relative to the adjacent valve flow channel and in vertical and horizontal directions relative to the direction of fluid flow is in the range of 0 to 0.0075 of plug port height in said vertical direction and in the range of 0 to 0.02 of plug port width in said horizontal direction.

* * * * *

UNITED STATES PATENT AND TRADEMARK OFFICE
CERTIFICATE OF CORRECTION

PATENT NO. : 4,291,859
DATED : September 29, 1981
INVENTOR(S) : Javed Qasim, Samuel C. Walker, Paul A. Longwell It is certified that error appears in the above—identified patent and that said Letters Patent is hereby corrected as shown below:

Col. 1, Line 7, change "ddrop" to --drop--.

Col. 5, Line 21, change "$K_t = K_{to}[1-(A_2/A_1)1.5]$ to $--K_t = K_{to}[1-(\frac{A_2}{A_1})^{1.5}]--$.

Signed and Sealed this

Ninth Day of February 1982

[SEAL]

Attest:

GERALD J. MOSSINGHOFF

Attesting Officer

Commissioner of Patents and Trademarks